United States Patent
Stribling et al.

(10) Patent No.: US 8,616,502 B1
(45) Date of Patent: Dec. 31, 2013

(54) DEPLOYABLE SOLAR PANEL ASSEMBLY FOR SPACECRAFT

(75) Inventors: Ray A. Stribling, Redondo Beach, CA (US); Allen D. Bakalyar, El Segundo, CA (US)

(73) Assignee: The Boeing Company, Chicago, IL (US)

( * ) Notice: Subject to any disclaimer, the term of this patent is extended or adjusted under 35 U.S.C. 154(b) by 525 days.

(21) Appl. No.: 12/876,103

(22) Filed: Sep. 3, 2010

(51) Int. Cl.
*B64G 1/44* (2006.01)

(52) U.S. Cl.
USPC .................. 244/172.7; 244/172.6; 136/245

(58) Field of Classification Search
USPC .......... 244/158.1, 172.6, 127.7, 172.8, 171.7; 136/245
See application file for complete search history.

(56) References Cited

U.S. PATENT DOCUMENTS

| | | | | |
|---|---|---|---|---|
| 3,735,943 A | * | 5/1973 | Fayet | 244/172.7 |
| 5,833,176 A | * | 11/1998 | Rubin et al. | 244/172.7 |
| 5,857,648 A | * | 1/1999 | Dailey et al. | 244/172.6 |
| 6,119,986 A | * | 9/2000 | Stribling, Jr. | 244/172.8 |
| 6,983,914 B2 | | 1/2006 | Stribling et al. | |
| 2007/0262204 A1 | * | 11/2007 | Beidleman et al. | 244/172.6 |

OTHER PUBLICATIONS

Arastu, A., "FAST—Innovative Solar Power Systems for Future High Power Space Missions," presentation published Apr. 19-22, 2010 in Manhattan Beach, California by author.

\* cited by examiner

*Primary Examiner* — Timothy D Collins
*Assistant Examiner* — Jamie S Stehle
(74) *Attorney, Agent, or Firm* — Kevin G. Fields

(57) ABSTRACT

A deployable solar panel assembly including a housing, a solar panel receivable in the housing, and first and second support structures disposed on the housing proximate the lateral edges of the solar panel. The first and second support structures each include an extension member connected to the housing and a pair of tethering members pivotably connected to the housing on opposite sides of the housing. The pair of tethering members are foldable against the housing and, upon deployment, a distal end of each tethering member projects outward from the opposite sides of the housing. The distal end of a deployed solar panel is supported in an extended position by the extension member, and supported against displacement out of the plane of the panel by tethers connected to the distal ends of the pair of tethering members. Spacecraft employing the deployable solar panel assembly and methods of deploying the assembly are also disclosed.

20 Claims, 6 Drawing Sheets

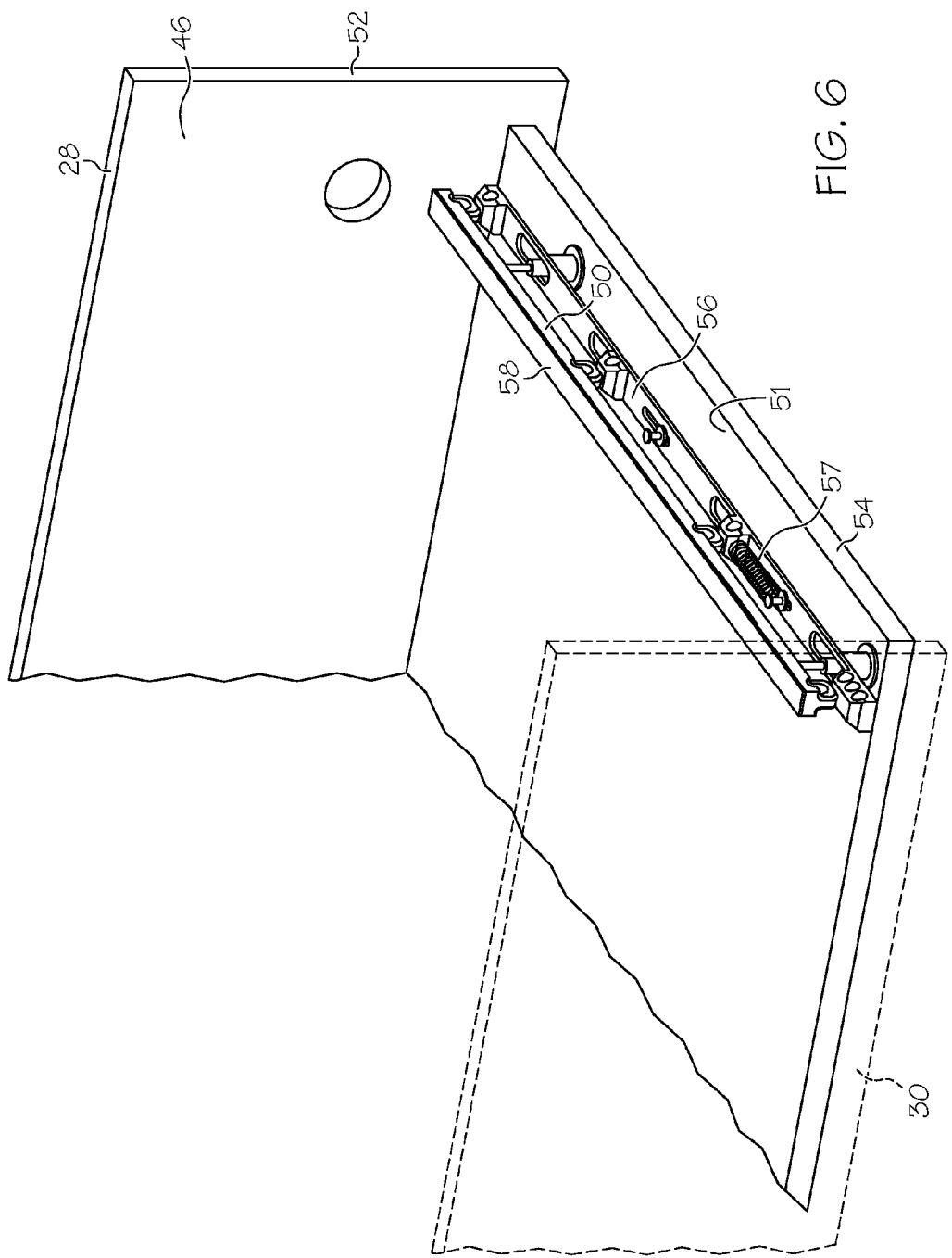

DEPLOYABLE SOLAR PANEL ASSEMBLY FOR SPACECRAFT

FIELD

This application relates to solar panel assemblies and, more particularly, to solar panel assemblies deployable from a spacecraft.

BACKGROUND

Advances in solar cell technology have resulted in the development of lightweight, highly efficient, and highly reliable solar panels. As such, solar panels are commonly used as the primary power source on spacecraft such as satellites.

A typical spacecraft may include two solar wings positioned on opposite sides of the spacecraft. The solar panels making up the wings may be deployed in a large "H" configuration, with the spacecraft disposed at the center of the "H". A propulsion plume generated by the spacecraft, most typically a liquid propellant exhaust plume, may be projected between the solar panels in a relatively tight pattern to avoid damaging the solar panels. However, the propulsion plume generated by spacecraft fitted with an electric propulsion system typically cannot be restricted to such a tight pattern, and instead spreads out at large acute angle with respect to the longitudinal axis of the spacecraft. An electric propulsion system also typically generates a charged and highly corrosive exhaust plume. As such, the plume of a spacecraft fitted with an electric propulsion system may damage the solar cells of solar panels deployed in an "H" configuration.

The solar panels may also be deployed in a sideways "I" configuration, with the spacecraft disposed at the center of the "I". This reduces the risk of damage from a propulsion plume, but generally requires that the solar panel be mounted to the spacecraft at a proximal end rather than at a physical or conceptual midpoint. Consequently, a solar panel must extend approximately twice as far from a main support member (assuming a similar panel width) to provide the same panel area. Structures to stiffen such long solar panels, such as rigid telescoping frames, add significant weight and mechanical complexity to the solar panel assembly and/or the solar panel deployment system of the spacecraft.

Accordingly, those skilled in the art continue with research and development efforts in the field of space deployable solar panel assemblies.

SUMMARY

In a first aspect, a deployable solar panel assembly includes a housing, a solar panel receivable in the housing, a first support structure disposed on the housing proximate a first lateral edge of the solar panel, and a second support structure disposed on the housing proximate an opposite lateral edge of the solar panel. The first and second support structures each include an extension member and a pair of tethering members. The pair of tethering members are pivotally connected to the housing on opposite sides of the housing and foldable against the housing. Upon deployment, a distal end of each tethering member of the respective pairs projects outward from the side of the housing on which the tethering member is pivotally connected. The distal end of the solar panel is supported in an extended position by the extension member, and supported against displacement out of the plane of the panel by tethers connecting the distal end of the solar panel to the distal ends of the respective pairs of tethering members.

In a second aspect, a spacecraft includes a body that defines a body longitudinal axis and has a propulsion system coaxially aligned with said first longitudinal axis, and a deployable solar panel assembly connected to the body. The deployable solar array assembly includes a housing and a solar panel. The solar panel is receivable in the housing and deployable along a panel longitudinal axis which extends radially outward from the body longitudinal axis. First and second support structures, as well as other elements of the deployable solar array assembly, may be provided as described in the aforementioned first aspect.

In a third aspect, a method of deploying a deployable solar panel assembly which includes: a housing; a solar panel receivable in the housing; a first support structure disposed on the housing proximate a first lateral edge of the solar panel; and a second support structure disposed on the housing proximate an opposite lateral edge of the solar panel; with the first and second support structures each including an extension member and a pair of tethering members that are pivotably connected to the housing on opposite sides of the housing, the method including the steps of (1) extending each extension member to urge a distal end of the solar panel out of and away from the housing, and (2) pivoting each tethering member from a first position where the tethering member is folded against the housing to a second position where a distal end of the tethering member projects outward from the side of the housing on which the respective tethering member is pivotably connected, where tethers connect the distal end of the solar panel to the distal ends of the pairs of tethering members.

Other aspects of the deployable solar panel assembly and spacecraft employing such an assembly will become apparent from the following description, the accompanying drawings, and the appended claims.

BRIEF DESCRIPTION OF THE DRAWINGS

FIG. 6 is an abstracted cutaway view of the interior of end portion of the housing shown in FIG. 5, with the solar panel and solar panel mounting hardware omitted. An end structure 30 is represented as a plate shown in phantom lines for sake of clarity.

DETAILED DESCRIPTION

Figure 1:
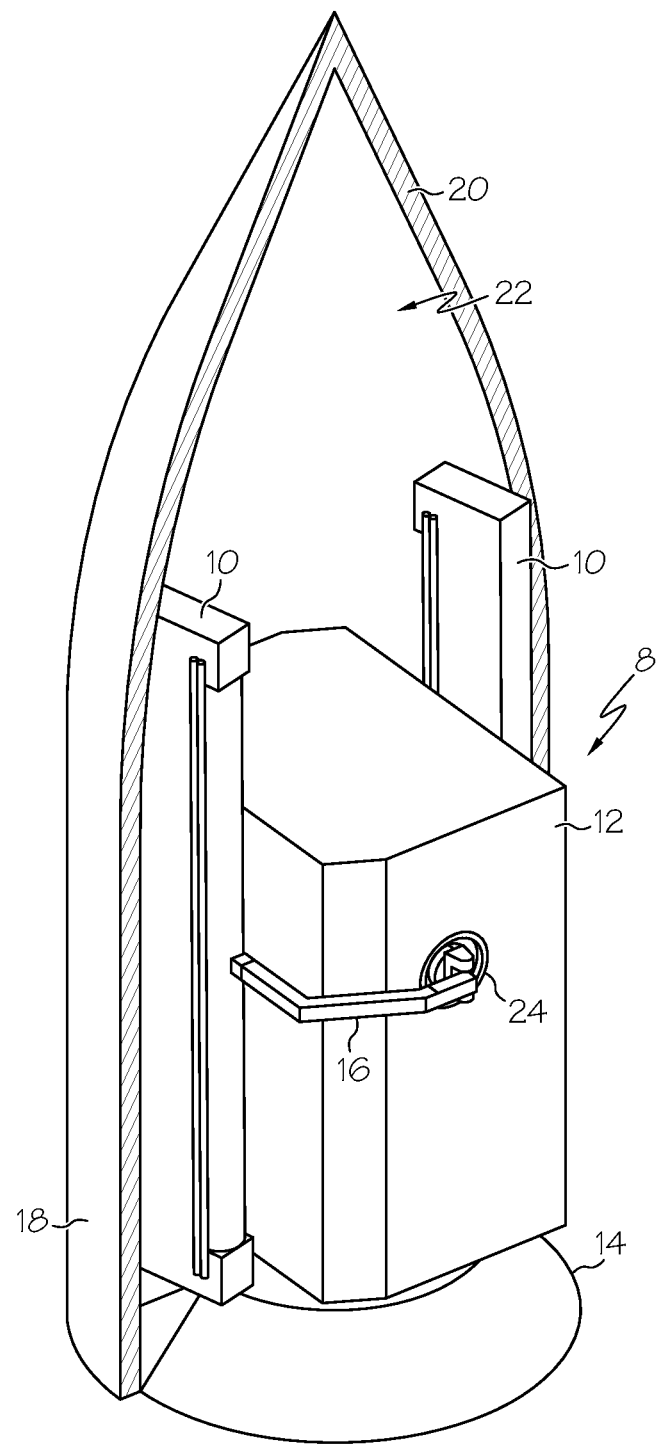
FIG. 1 is a perspective view of a spacecraft provided with the disclosed deployable solar panel assembly in accordance with one aspect of the disclosure, wherein the spacecraft is shown stowed in a payload fairing of a delivery vehicle.
Figure 2:
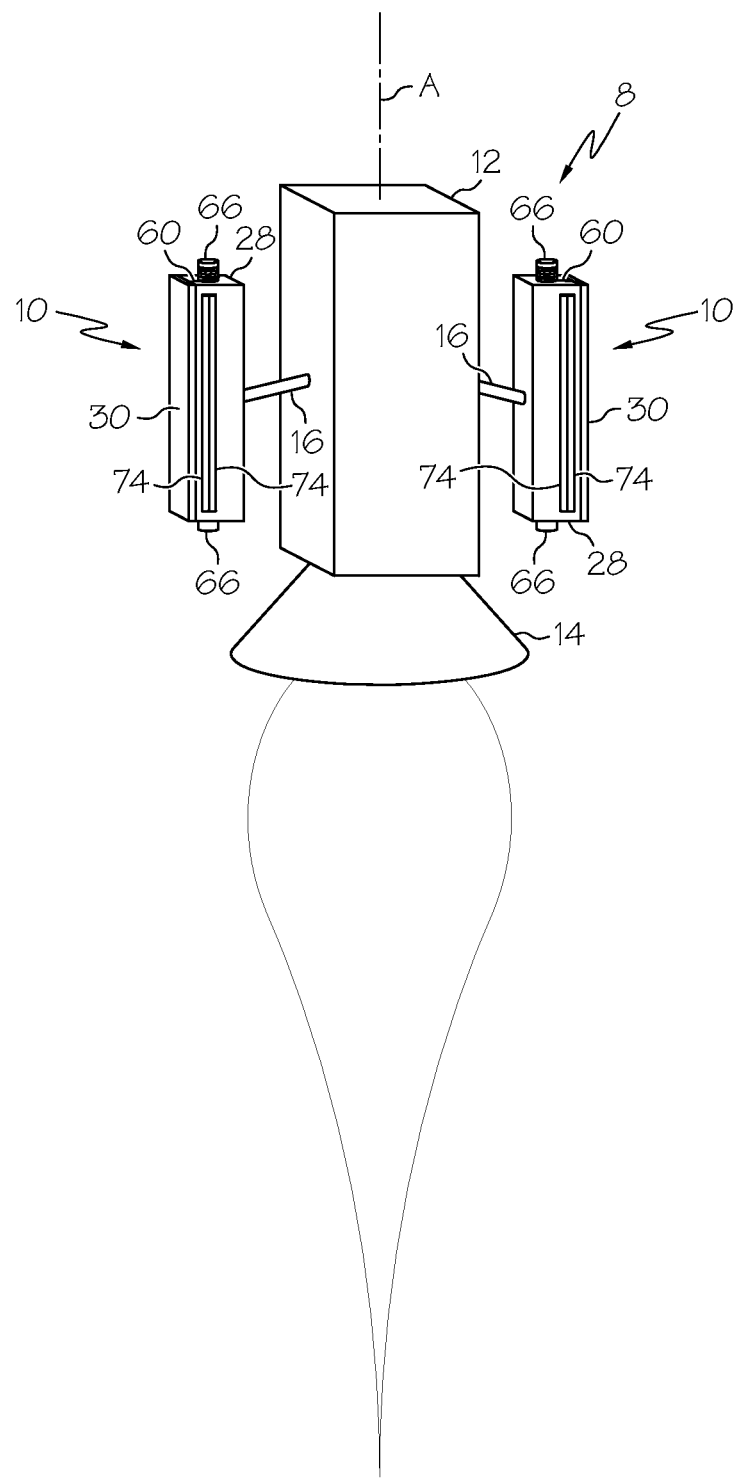
FIG. 2 is a schematic perspective view of the spacecraft of FIG. 1 shown in a partially deployed configuration.
Figure 3:
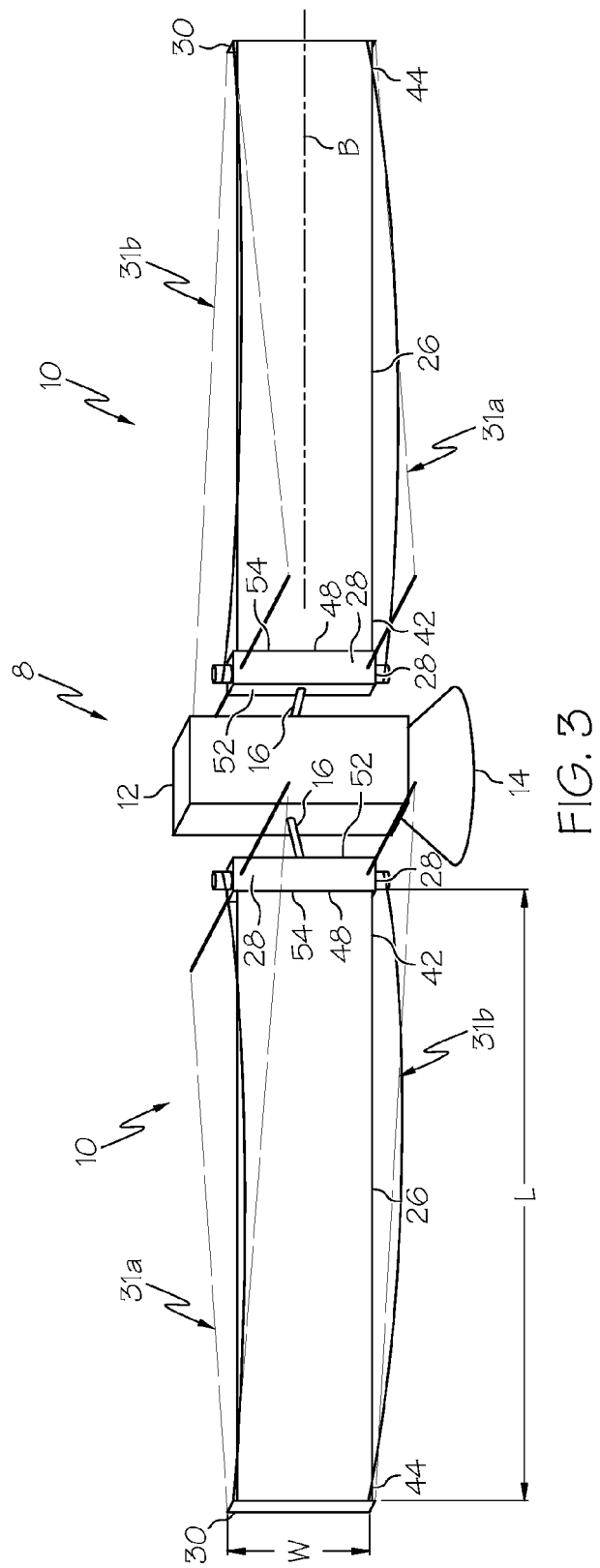
FIG. 3 is a schematic perspective view of the spacecraft of FIGS. 1 and 2 shown in a fully deployed configuration.

Referring to FIGS. 1-3, a spacecraft 8, such as a satellite, may include one or more deployable solar panel assemblies 10 and a spacecraft body 12 defining a longitudinal axis A. The spacecraft body 12 may have a propulsion system 14, such as an electric propulsion system, coaxially aligned with the longitudinal axis A. Yokes 16 may connect the deployable solar panel assemblies 10 to the spacecraft body 12.

As shown in FIG. 1, the spacecraft 8 may be stowed in a delivery vehicle 18 for delivery into orbit. For example, the delivery vehicle 18 may be a rocket or the like, and may include a stowage compartment 20, such as a payload fairing, that defines an internal volume 22. To achieve the stowed configuration, the yokes 16 connected to the deployable solar panel assemblies 10 may pivot relative to the spacecraft body 12 at pivot points 24 (only one pivot point 24 is shown in FIG. 1) to collapse the deployable solar panel assemblies 10 against the spacecraft body. The spacecraft 8 may subsequently be closely received in the internal volume 22 of the stowage compartment 20 of the delivery vehicle 18.

Once the spacecraft 8 has exited the delivery vehicle 18, the spacecraft may be deployed to an operational configuration, wherein the deployable solar panel assemblies 10 may collect and convert solar radiation into electrical energy to power the spacecraft. As shown in FIG. 2, the spacecraft 8 may be partially deployed by extending the deployable solar panel assemblies 10 into a deployment position. This may be achieved by pivoting the yokes 16 relative to the spacecraft body 12 about the pivot points 24 (FIG. 1), such that the yokes extend radially outward from the spacecraft body with respect to the longitudinal axis A, to radially separate the deployable solar panel assemblies 10 from the spacecraft body 12. Then, as shown in FIG. 3, the spacecraft 8 may be fully deployed by deploying the solar panels 26 of the deployable solar panel assemblies 10.

Figure 4:
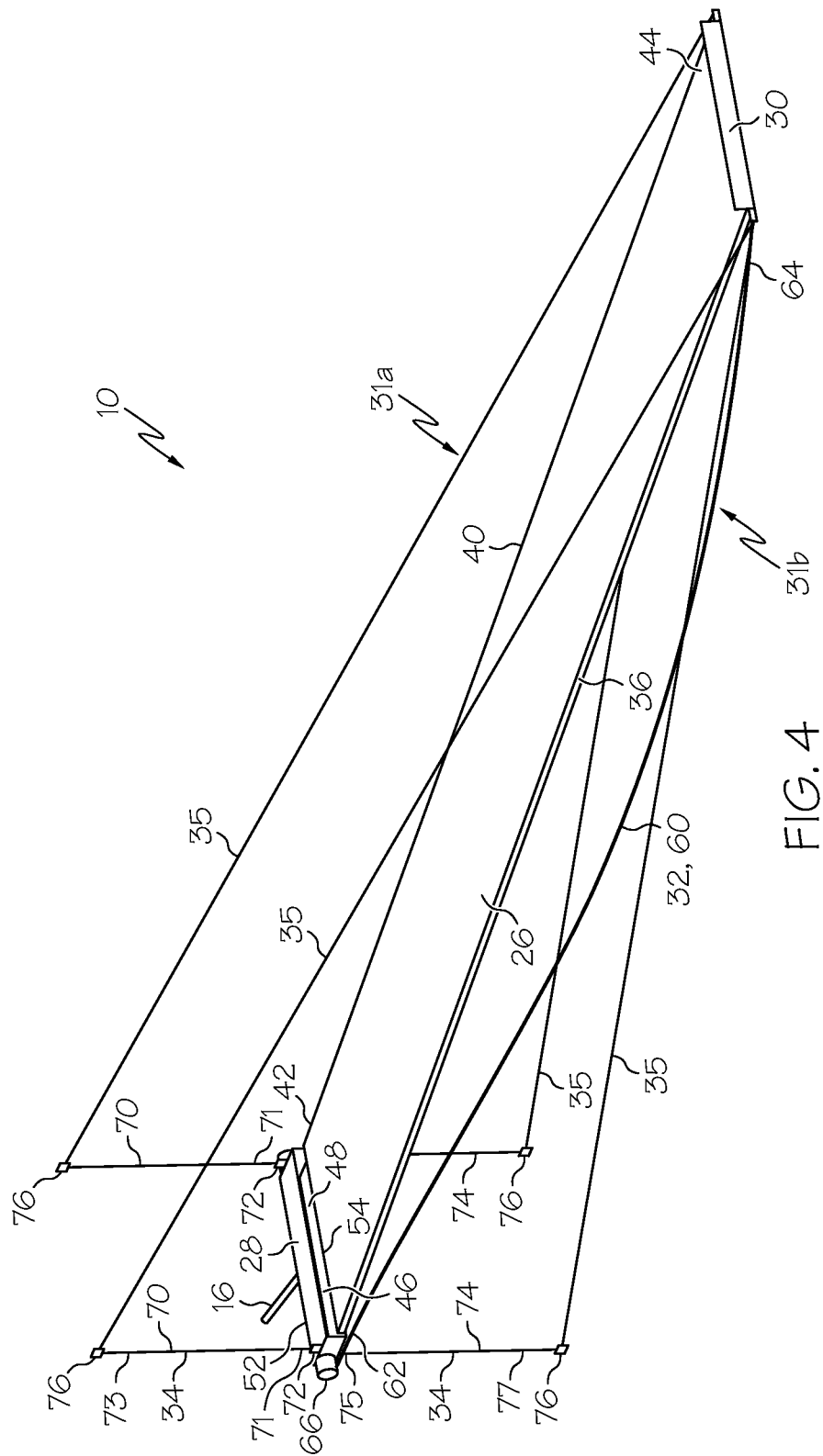
FIG. 4 is a perspective view of one deployable solar panel assembly.

One aspect of the disclosed deployable solar panel assembly 10 is shown in FIG. 4, and may include a solar panel 26, a housing 28, a first support structure 31a disposed proximate a first lateral edge 36 of the solar panel 26, and a second support structure 31b disposed proximate an opposite lateral edge 40 of the solar panel 26. The first and second support structures each include an extension member 32 and a pair of tethering members 34 disposed on opposite sides of the housing 28.

The solar panel 26 may have a length L and a width W, and may define a longitudinal axis B extending the length L of the panel. The length L may be greater than the width W. In one particular expression, the length L of the solar panel 26 may be at least two times the width W. In another expression, the length L of the solar panel 26 may be at least five times the width W. In yet another expression, the length L of the solar panel 26 may be at least ten times the width W.

A proximal end 42 of the solar panel 26 may be connected to the housing 28 and a distal end 44 of the solar panel 26 may include an end structure 30 (e.g., an end plate or beam). In the stowed configuration (FIG. 2), the solar panel 26 may be received in the housing 28 and the end structure 30 may enclose the panel within the housing 28. In the deployed configuration (FIG. 3), the extension member 32 may urge the distal end 44 of the solar panel 26 out of and away from the housing 28, and the tethering members 34 may supply a reacting force to the distal end 44 of the solar panel 26 through tethers 35 to precisely position the distal end and support the panel against displacement out of the plane of the panel. The longitudinal axis B of the solar panel 26 preferably extends radially outward from the longitudinal axis A of the spacecraft body 12, but the disclosed deployable solar panel assemblies 10 may be used to deploy a solar panel 26 in other orientations depending upon the requirements of any particular spacecraft configuration.

The extension member 32 may be any device or system configured to apply a biasing force to the distal end 44 of the solar panel 26 to urge the distal end out of and away from the housing 28 and to support the panel in an extended position such as that of the deployed configuration shown in FIG. 4. In one particular construction, the extension member 32 may include a bow spring 60 having a proximal end 62 connected to the housing 28 and a distal end 64 connected to the distal end 44 of the solar panel 26. As a specific example, the distal end 64 of the bow spring 60 may be connected to the end structure 30, which may be an element of the distal end 44 of the solar panel 26.

The bow spring 60 may be received in, and may extend from, a spring housing 66 connected to the housing 28. In the stowed configuration (FIG. 2), the bow spring 60 may be received in the spring housing 66, with only the distal end 64 of the bow spring extending out of the spring housing to connect to the end structure 30. For example, in the stowed configuration (FIG. 2), the bow spring 60 may be received in the spring housing 66 as a coil. Then, when the deployable solar panel assembly 10 is deployed, extension of the bow spring 60 may urge the distal end 44 of the solar panel 26 out of and away from the housing 28, as shown in FIG. 4.

Figure 5:
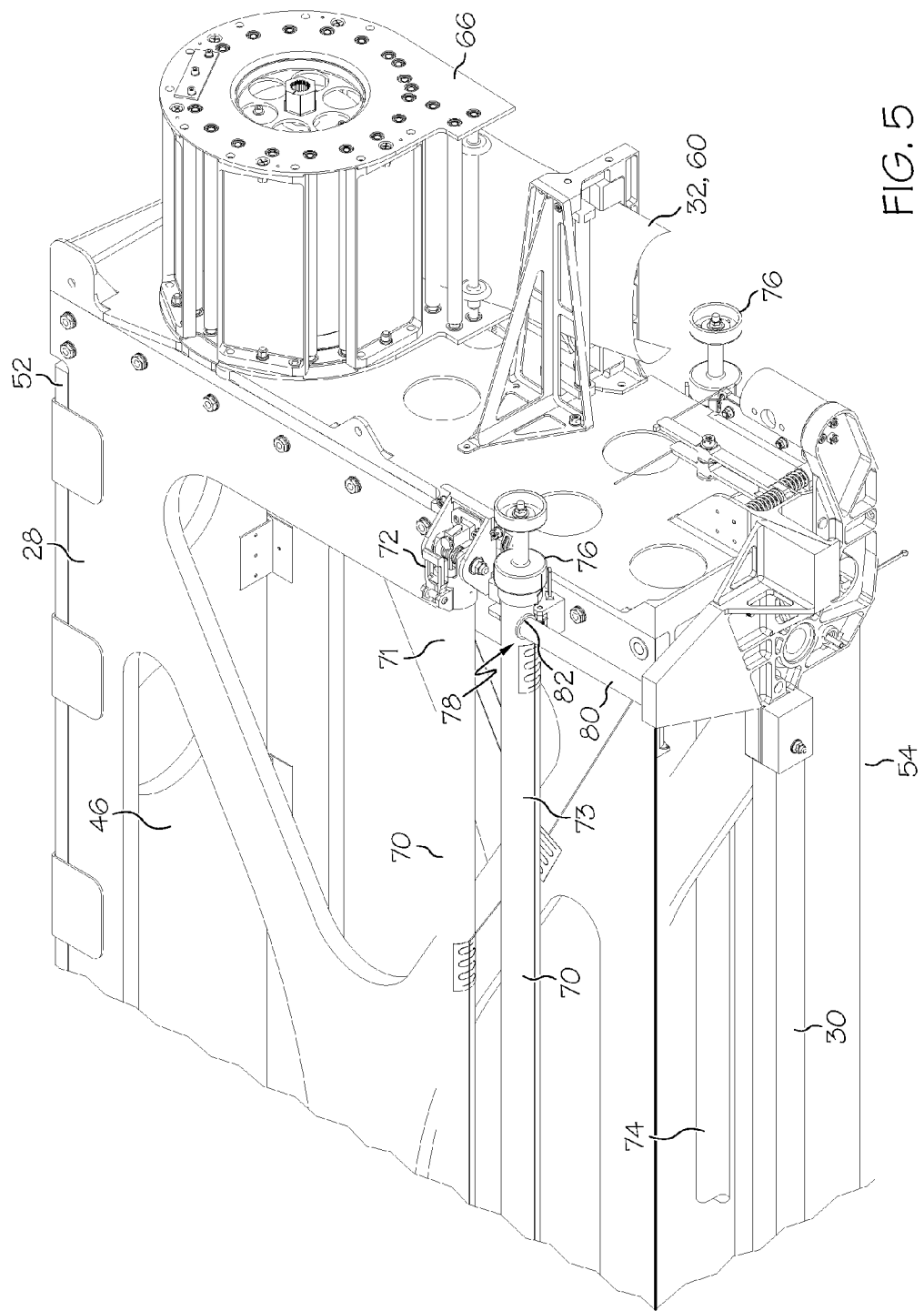
FIG. 5 is a perspective view of an end portion of the housing of the deployable solar panel assembly of FIG. 4.

The pair of tethering members 34 are foldable against or within the outer surface of the housing 28, with the proximal end of each tethering member 34 being pivotably connected to the housing 28. The tethering members 34 may be any unfoldably projecting structure capable of counterbalancing the biasing force of the extension member 32 at full extension, and the distal ends of the tethering members 34 are connected to the distal end 44 of the solar panel 26 by tethers 35 tensioned to support the panel against displacement out of the plane of the panel, such as the plane of the deployed configuration shown in FIG. 4. In one particular construction, the pair of tethering members 34 may be an upper beam 70 and a lower beam 74. A proximal end 71 of upper beam 70 and a proximal end 75 of lower beam 74 may include spring-biased hinges 72 (shown in FIG. 5 at the proximal end of one of the second pair of tethering members) configured to automatically project a distal end 73 of upper beam 70 and a distal end 77 of lower beam 74, respectively, outward from the housing 28. In a variation of the construction, the distal end 73 of upper beam 70 and the distal end 77 of lower beam 74 may include spools 76 which release the tethers 35 during deployment. In another variation of the construction (not shown) the distal end 73 of upper beam 70 and the distal end 77 of lower beam 74 may include a cradle aperture (an aperture with contoured sides for receiving the vertex of a tether routed in a V-shaped configuration), with spools 76 being connected to the housing 28 rather than the tethering members 34 themselves, and tethers 35 slidably connected to the beams through the cradle apertures. In other constructions, the pair of tethering members may be, for instance, frames (e.g., an A-frame) with the proximal ends of the frames being pivotably connected to the housing 28, and including spring biased-hinges, spools, and/or cradle apertures such as those described above.

A retention mechanism 78, such as a catch, clasp, or pin, may hold the distal end of an individual tethering member 34 against the housing 28 during stowage prior to deployment, and then be released during deployment to allow the tethering member to be unfolded and projected. As a specific example, the retention mechanism 78 may be a pin 80 projecting proximally from the end plate 30 of the distal end 44 of the solar panel 26. The pin 80 may pass through an aperture 82 disposed in the distal end of a tethering member 34 (e.g. distal end 73 of upper beam 70 or distal end 77 of lower beam 74, as described above). Consequently, as the extension member 32 urges the distal end 44 of the solar panel 26 out of and away from the housing 28, outward movement of the end structure 30 causes the pin 80 to withdraw from the aperture 82, allowing the tethering member 34 to pivot outward from the housing. Where spring-biased hinges 72 are used as the pivotable connection to the housing 28, pivoting of the tethering member 34 can automatically result from release of the retention mechanism 78. In various constructions, a retention mechanism 78 with other mechanisms may be mechanically linked to the end structure 30 and configured to release upon outward movement of the end structure. In other constructions, a retention mechanism 78 lacking any mechanical linkage to the end structure 30 may be electromechanically actuated by the spacecraft 8 during deployment.

Upon deployment, each tethering member 34 of the pair may pivot to project outward from the side of the housing 28 on which the tethering member 34 is disposed. The distal end of the tethering member may project in a direction generally perpendicular to a plane defined by the deployed solar panel 26, but may be canted from a strictly perpendicular orientation by an angle of ±30°. The pair of tethering members 34 consequently will project in generally opposite directions, considering the combined effects of canting (i.e., rather than being parallel, the pair of tethering members may diverge from the housing 28 at an angle of as little as 120°). The tethers 35 may be tensioned to limit the extension of the solar panel 26 from the housing 28, and to provide an out-of-plane stiffness to the distal end 44 of the solar panel 26.

The housing 28 may be a three-dimensional structure that defines an internal volume 46 and an opening 48 into the internal volume. For example, the housing 28 may be shaped as a rectangular box and the opening 48 may define one side of the rectangular box. Other shapes and configurations for the housing 28, such as higher order polygons or even cylinders, will be apparent to the skilled artisan. The dimensions of the housing 28, particularly the size and shape of the internal volume 46 of the housing 28, may be dictated by the dimensions and configuration of the solar panel 26. Specifically, the internal volume 46 of the housing 28 may be of a sufficient size and shape to receive the solar panel 26 when the solar panel 26 is in a stowed configuration (e.g., stacked sub-assemblies, folded panel segments, or a flexible member rolled up on a spool).

As shown in FIG. 6, in one particular implementation, the housing 28 may include one or more collapsible rails 50 (only one is shown in FIG. 6) positioned in the internal volume 46 of the housing 28 and connected to an inner wall 51 of the housing 28. The collapsible rail 50 may be elongated and may extend from a proximal end 52 of the housing 28 to a distal end 54 of the housing 28. The collapsible rail 50 may engage the solar panel 26 when the solar panel 26 is stowed in the internal volume 46 of the housing, thereby minimizing movement of the solar panel 26 relative to the housing 28, which may damage the solar panel 26. During deployment of the solar panel 26 from the housing 28, the collapsible rail 50 may be disengaged from the solar panel 26. In one particular construction, the rail 50 may have an upper rail segment 58 and a lower rail segment 56 with mutually opposing undulating surfaces, so that longitudinal movement of one rail segment with respect to the other causes the peaks and valleys of the undulations to shift from a peak-to-peak opposition to a peak-to-valley opposition. Upper rail segment 58 then collapses toward lower rail segment 56 and the inner wall 31 of the housing 28 to partially release the solar panel 26. As a specific example, the lower rail segment 56 may be biased to shift distally from a peak-to-peak opposition to a peak-to-valley opposition by a spring 57. End structure 30 may abut the distal end of lower rail segment 56 to retain the lower rail segment in a peak-to-peak opposition during stowage prior to deployment. Consequently, as the extension member 32 urges the distal end 44 of the solar panel 26 out of and away from the housing 28, outward movement of the end structure 30 permits the lower rail segment 56 to shift distally to a peak-to-valley opposition, and upper rail segment 58 collapses toward the lower rail segment 56 and the inner wall 31 of the housing 28 to partially release the solar panel 26.

Those skilled in the art will appreciate that various structures and assemblies configured with solar cells, particularly arrays of solar cells, may be suitable for use as the solar panel 26 of the disclosed deployable solar panel assembly 10. Specifically, the solar panel 26 of the disclosed deployable solar panel assembly 10 may be capable of being deployed from a stowed configuration, wherein the solar panel 26 may occupy a minimum amount of space within the internal volume 46 of the housing 28, to a deployed configuration, wherein the solar panel 26 may extend outward from the housing 28 and may have a maximum surface area for exposing the solar cells of the solar panel 26 to solar radiation. Various techniques may be used for achieving stowability.

In first implementation, the solar panel 26 may include an array of flexibly joined or hinged panel segments. In the deployed configuration, the solar panel 26 may extend as a generally flat, planar panel or sheet. In the stowed configuration, the solar panel 26 may be fully received within the internal volume 46 of the housing 28. In a first expression of the first implementation, the solar panel 26 may be folded into a stack, and the stack may be closely received in the internal volume 46 of the housing 28. For example, the solar panel 26 may be include accordion folds or accordion-hinged panel segments that allow the solar panel 26 to expand from a folded stack configuration to a generally planar sheet. In a second expression of the first implementation, a proximal end 42 of the solar panel 26 may be anchored to a rotatable structure, such as a beam or rod, held in the internal volume 40 of the housing, and the solar panel may be folded around itself in a spiraling tube-like structure closely received in the internal volume 46 of the housing 28. For example, the solar panel 26 may be include regularly spaced apart folds or hinged panel segments that allow the solar panel 26 to be unfolded or, loosely speaking, unrolled from a tube-like configuration to a generally planar sheet.

In a second implementation, the solar panel 26 may be a continuous, elongated array of flexible solar cells that may be rolled over a spindle, and the rolled panel 26 and spindle may be closely received in the internal volume 46 of the housing 28. The solar panel 26 would, within the limits of its flexibility, be wound up on the spindle like other flexible sheet-like members and deployed by unwinding the panel from the spindle.

Accordingly, the disclosed deployable solar array assembly 10 may include a solar panel 26 that is deployed out of and away from a housing 28 using only a few simple mechanical elements, namely, first and second extension members, which may be bow springs, and first and second groups of tethers 35 associated with first and second pairs of tethering members 34. The extension members 32 and tethers 35 may ensure that the deployed solar panel 26 remains flat, precisely positioned in tension, and stable, while more complex mechanical elements such as the tethering members 34 and bow spring housing 66 remain with the housing 28 of the deployable solar array assembly 10.

Although various aspects of the disclosed deployable solar array assembly have been shown and described, modifications may occur to those skilled in the art upon reading the specification. The present application includes such modifications and is limited only by the scope of the claims.

What is claimed is:

1. A deployable solar panel assembly comprising:
a housing;
a solar panel receivable in the housing;

a first support structure disposed on the housing proximate a first lateral edge of the solar panel, and a second support structure disposed on the housing proximate an opposite lateral edge of the solar panel, the first and second support structures each including an extension member connected to the housing and a pair of tethering members pivotably connected to the housing, separately from the connection of the extension member to the housing, on opposite sides of the housing;

wherein, with respect to each support structure, the pair of tethering members are foldable against the exterior of the housing and, upon deployment, a distal end of each tethering member of the pair projects outward from the side of the housing on which the tethering member is pivotably connected; and wherein, with respect to each support structure, and upon deployment, the distal end of the solar panel is supported in an extended position by the extension member, and supported against displacement out of the plane of the panel by tethers connecting the distal end of the solar panel to the distal ends of the pair of tethering members.

2. The deployable solar panel assembly of claim 1, wherein the distal end of the solar panel includes an end structure and, prior to deployment, the end structure encloses the solar panel within the housing.

3. The deployable solar panel assembly of claim 1, wherein, with respect to each support structure, the extension member is a bow spring having a proximal end connected to the housing and a distal end connected to the distal end of the solar panel.

4. The deployable solar panel assembly of claim 1, wherein, with respect to each support structure, the pair of tethering members are an upper beam and a lower beam.

5. The deployable solar panel assembly of claim 1, wherein, with respect to each support structure and each tethering member, the pivotable connection includes a spring-biased hinge configured to automatically project a distal end of the respective tethering member outward from the housing.

6. The deployable solar panel assembly of claim 1, wherein, with respect to each support structure and each tethering member, a distal end of the respective tethering member includes a spool which releases the tether connected to the distal end of the solar panel.

7. The deployable solar panel assembly of claim 1, wherein, with respect to each support structure and each tethering member, a retention mechanism holds a distal end of the respective tethering member against the exterior of the housing prior to deployment.

8. The deployable solar panel assembly of claim 7, wherein the distal end of the solar panel includes an end structure, wherein a distal end of the respective tethering member includes an aperture, and wherein the retention mechanism is a pin projecting proximally from the end structure and passing through the aperture.

9. The deployable solar panel assembly of claim 7, wherein the distal end of the solar panel includes an end structure, and wherein the retention mechanism is a catch, clasp, or pin mechanically linked to the end structure, and wherein the retention mechanism is configured to release the distal end of the respective tethering member upon deployment of the end structure.

10. The deployable solar panel assembly of claim 7, wherein the distal end of the solar panel includes an end structure, wherein the retention mechanism is a catch, clasp, or pin not mechanically linked to the end structure, and wherein the retention mechanism is electromechanically actuated to release the distal end of the respective tethering member upon deployment of the end structure.

11. The deployable solar panel assembly of claim 1, wherein, with respect to each support structure and each tethering member, and upon deployment, the distal end of the respective tethering member projects in a direction generally perpendicular to the plane of the deployed solar panel.

12. The deployable solar panel assembly of claim 11, wherein the respective tethering member is canted from a strictly perpendicular orientation by an angle of no more than 30 degrees.

13. A spacecraft comprising:
a body that defines a body longitudinal axis and has a propulsion system coaxially aligned with said body longitudinal axis;
a deployable solar array assembly connected to said body, said deployable solar array assembly comprising:
a housing;
a solar panel receivable in the housing and deployable along a panel longitudinal axis which extends radially outward from the body longitudinal axis;
a first support structure disposed on the housing proximate a first lateral edge of the solar panel, and a second support structure disposed on the housing proximate an opposite lateral edge of the solar panel, the first and second support structures each including an extension member connected to the housing and a pair of tethering members pivotably connected to the housing, separately from the connection of the extension member to the housing, on opposite sides of the housing;

wherein, with respect to each support structure, the pair of tethering members are foldable against the exterior of the housing and, upon deployment, a distal end of each tethering member of the pair projects outward from the side of the housing on which the tethering member is pivotably connected; and wherein, with respect to each support structure, and upon deployment, the distal end of the solar panel is supported in an extended position by the extension member, and supported against displacement out of the plane of the panel by tethers connecting the distal end of the solar panel to the distal ends of the pair of tethering members.

14. The spacecraft of claim 13, wherein, with respect to each support structure, the extension member is a bow spring having a proximal end connected to the housing and a distal end connected to the distal end of the solar panel.

15. The spacecraft of claim 13, wherein, with respect to each support structure, the pair of tethering members are an upper beam and a lower beam.

16. The spacecraft of claim 13, wherein, with respect to each support structure and each tethering member, the pivotable connection includes a spring-biased hinge configured to automatically project a distal end of the respective tethering member outward from the housing.

17. The spacecraft of claim 13, wherein, with respect to each support structure and each tethering member, a distal end of the respective tethering member includes a spool which releases the tether connected to the distal end of the solar panel.

18. The spacecraft of claim 13, wherein with respect to each support structure and each tethering member, a retention mechanism holds a distal end of the respective tethering member against the exterior of the housing prior to deployment.

19. The spacecraft of claim 13, wherein, with respect to each support structure and each tethering member, and upon deployment, the distal end of the respective tethering member projects in a direction generally perpendicular to the plane of the deployed solar panel.

20. A method of deploying a deployable solar panel assembly comprising a housing; a solar panel receivable in the housing; a first support structure disposed on the housing proximate a first lateral edge of the solar panel; and a second support structure disposed on the housing proximate an opposite lateral edge of the solar panel, the first and second support structures each including an extension member connected to the housing and a pair of tethering members pivotably connected to the housing, separately from the connection of the extension member to the housing, on opposite sides of the housing, the method comprising the steps of:
  (1) with respect to each support structure, extending the extension member to urge a distal end of the solar panel out of and away from the housing; and
  (2) with respect to each support structure and each tethering member, pivoting the respective tethering member from a first position wherein the respective tethering member is folded against the exterior of the housing to a second position where a distal end of the respective tethering member projects outward from the side of the housing on which the respective tethering member is pivotably connected;
wherein, with respect to each support structure, tethers connect the distal end of the solar panel to the distal ends of the pair of tethering members.

* * * * *